United States Patent
Perry

(10) Patent No.: US 7,312,615 B2
(45) Date of Patent: Dec. 25, 2007

(54) SYSTEM AND METHOD FOR COMMUNICATING CALIBRATION DATA

(75) Inventor: Dwayne Perry, Raleigh, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 868 days.

(21) Appl. No.: 10/608,758

(22) Filed: Jun. 27, 2003

(65) Prior Publication Data

US 2004/0264581 A1    Dec. 30, 2004

(51) Int. Cl.
*G01L 3/22* (2006.01)
*G01R 35/00* (2006.01)

(52) U.S. Cl. ............. 324/601; 73/862.474; 73/862.325

(58) Field of Classification Search ................. 324/601, 324/539; 340/665; 73/862.474; 375/257
See application file for complete search history.

(56) References Cited

U.S. PATENT DOCUMENTS

| 4,320,392 A | * | 3/1982 | Giovinazzo et al. ..... 73/862.68 |
| 4,704,909 A | * | 11/1987 | Grahn et al. ........... 73/862.043 |
| 4,833,624 A | * | 5/1989 | Kuwahara et al. .......... 700/249 |
| 5,445,036 A | * | 8/1995 | Hordnes et al. ....... 73/862.321 |
| 5,573,079 A | * | 11/1996 | Suda et al. ................. 180/444 |
| 5,712,563 A | * | 1/1998 | Kawagoe et al. ...... 324/207.19 |
| 6,216,056 B1 | * | 4/2001 | Ito et al. ..................... 700/157 |
| 6,373,262 B1 | * | 4/2002 | Herring et al. ............ 324/647 |
| 2003/0065467 A1 | * | 4/2003 | Schuh et al. .................. 702/99 |
| 2003/0194946 A1 | * | 10/2003 | Malkin et al. ................. 451/8 |

* cited by examiner

*Primary Examiner*—Anjan Deb
(74) *Attorney, Agent, or Firm*—Coats & Bennett, P.L.L.C.

(57) ABSTRACT

A Force/Torque (FT) sensor includes memory for storing calibration data associated with the FT sensor. Force and torque analog signals are output to a data acquisition (DAQ) system. The digital calibration data is output to the DAQ system as a digital bitstream comprising a series of predetermined voltage levels driven for predetermined durations. The DAQ system interprets the series of voltage levels on the calibration input as a digital bitstream, receives and quantizes the force/torque signals, and calibrates the force/torque signals using the calibration data. Alternatively, the calibration signals may be routed to a standard serial port on the DAQ system. For small form factor FT sensors, the calibration data may be stored in an associated power supply unit.

10 Claims, 1 Drawing Sheet

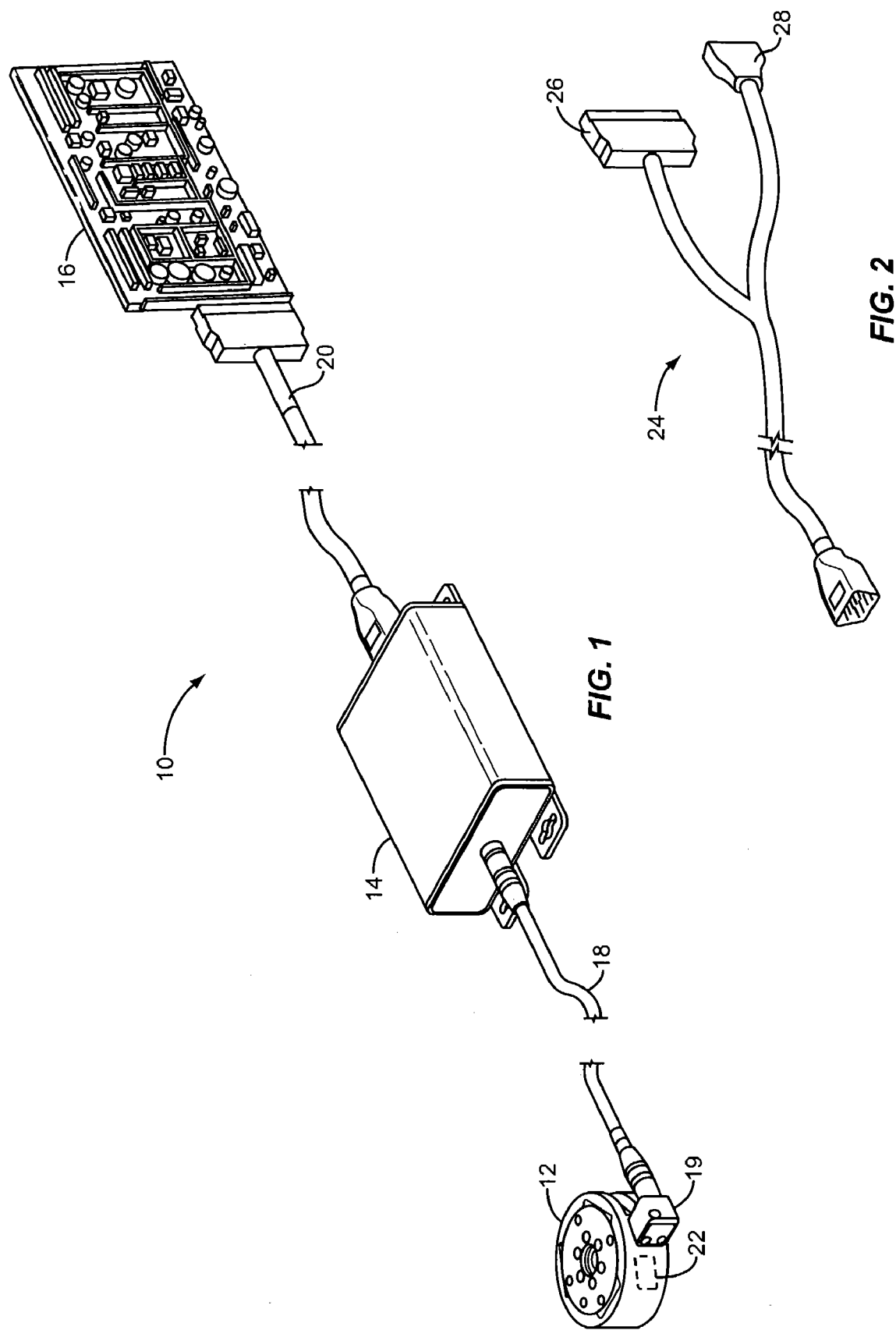

SYSTEM AND METHOD FOR COMMUNICATING CALIBRATION DATA

BACKGROUND OF THE INVENTION

The present invention relates generally to the field of sensor electronics and in particular to a system and method of communicating calibration data from a sensor to a data acquisition system.

Force/Torque (FT) sensors are widely utilized in a broad range of industrial and research applications, including robotics, telerobotics, product testing, orthopedic research, rehabilitation research, haptics research, prosthetics, real-time force control and force feedback, robotic surgery, and many others. FT sensors measure force and/or torque in one or more axes. A six-axis FT sensor, for example, measures force and torque in three orthogonal axes ($F_x$, $F_y$, $F_z$, $T_x$, $T_y$ and $T_z$). FT sensors comprise one or more transducers (such as strain gauges) that translate an experienced force or torque into an electrical signal, typically an analog voltage level. The analog signals representing force and torque measurements are often transmitted from the FT sensor, which is often mounted on a robot arm or other restricted space, to a data acquisition (DAQ) system, which may be located some distance from the FT sensor.

To convert a force or torque experienced by the FT sensor from its analog voltage output level to a standard unit, each FT sensor typically has a set of calibration data associated with it. Usually, due to variations in the physical properties of the sensor transducers, each individual FT sensor has a unique set of calibration data; using the calibration data for one FT sensor to calibrate the output of a different sensor—even one from of the same type—will yield erroneous force and torque readings. Conventionally, the calibration data are provided separately from their associated FT sensors, such as on a floppy disk, CD-ROM, or other convenient digital data storage/transfer medium. This practice has the serious disadvantage that, in practice, it is difficult to maintain each FT sensor with its appropriate calibration data, particularly in installations with many different FT sensors and (hence many different sets of calibration data). This leads to the use of incorrect calibration data for many FT sensors. At best, the results are nonsensical, and the correct calibration data must be located and loaded into the data acquisition system, and the force/torque measurements re-taken. At worst, the calibration data used may be very close to, but different from, the correct calibration data. In this case, the force/torque readings are erroneous, but not so egregiously erroneous as to flag suspicion (or trigger range-checking in software) that would indicate the calibration data are amiss.

In addition, even when careful tracking eliminates the confusion between calibration data and individual FT sensors, when an individual FT sensor requires re-calibration or calibration certification, both the FT sensor and its associated calibration must be supplied, requiring careful tracking and coordination throughout these processes as well as during typical use of the FT sensor.

One solution to this problem of physical separation of FT sensors and their associated calibration data is to locate the calibration data within the housing of the FT sensor itself, such as in a ROM, EEPROM, PAL, FPGA, register file, or the like, as is well known in the art. This may result in an FT sensor having analog force/torque reading outputs and digital calibration data, requiring two separate transmission paths (analog and digital) from the FT sensor to the data acquisition system.

One solution to this problem known in the art is to digitize the force/torque outputs at the FT sensor, and transmit only digital data-including both force/torque outputs and calibration data-to a data analysis system. However, this solution presents several drawbacks. FT sensors are often designed to be as compact as possible, and the inclusion of analog-to-digital converter (ADC) circuits in the FT sensor housing increases its size. In many applications, FT sensors must be rugged, and the ADC electronics may adversely impact ruggedness and reliability. Additionally, in many applications, precise quantization of the force/torque readings is required, necessitating sophisticated data acquisition (DAQ) electronics that may be updated several times over the life of the FT sensor. In such applications, a superior long-term solution is for the FT sensor to output analog values, and receive them with a DAQ card of arbitrary complexity and sophistication. An additional benefit of this solution is that a variety of DAQ cards are commercially available for each generation of computer interface bus, such as EISA, MCA, PCI, S-Bus, etc. Thus, the data analysis system can easily grow in sophistication without sacrificing the investment in a particular set of FT sensors. However, the problem of the association of digital calibration data with the analog FT sensor, and the transmission of both to a data acquisition system, remains.

SUMMARY OF THE INVENTION

The present invention relates to a system and method of communicating sensor data and calibration data from a sensor to a data acquisition (DAQ) system over a multi-conductor cable. The method includes storing calibration data associated with a sensor in the sensor, transmitting analog sensor data from the sensor to the DAQ system on a plurality of conductors, and transmitting digital calibration data from the sensor on at least one conductor. The digital calibration data is transmitted as a digital bitstream by successively driving the voltage on the analog line to first and second predetermined voltage levels for predetermined durations. The DAQ system interprets the received first and second voltage levels as a digital serial bitstream.

BRIEF DESCRIPTION OF DRAWINGS

FIG. 1 is a representation of the components of a Force/Torque data acquisition system.

FIG. 2 is depiction of a data transmission cable having two interfaces at one end thereof.

DETAILED DESCRIPTION OF THE INVENTION

FIG. 1 depicts a Force/Torque (FT) sensor and data acquisition system, indicated generally by the numeral 10. The system 10 comprises an FT sensor 12, a power supply 14, and a data acquisition (DAQ) card 16, which is typically installed in a PC or similar computer (not shown). FT sensor 12 is a six-axis force/torque sensor, producing six analog voltage level outputs representative of applied loading with six degrees of freedom: $F_x$, $F_y$, $F_z$, $T_x$, $T_y$ and $T_z$. The FT sensor 12 includes an internal interface board 22 containing electronics and storing digital calibration data associated with the FT sensor 12. The calibration data may be stored in ROM, EEPROM, PAL, FPGA, register files, or the like, as is well known in the art. The electronics on interface board 22 receive signals from the transducers within the FT sensor 12, such as strain gauges, and covert them to readable DAQ card signals using noise immunity technology. The DAQ card signals are preferably differentially driven for further noise immunity. Note that small form factor FT sensors 12 may not include an interface board 22, which in these cases resides in the power supply 14.

The analog force/torque outputs (i.e., DAQ card signals from the interface board 22 or transducer outputs if the interface board 22 is in the power supply 14) are communicated from the FT sensor 12 to the power supply 14 (and power from the power supply 14 to the FT sensor 12) via a transducer cable 18. The transducer cable 18 may attach to the FT sensor 12 via a connector 19, as shown. Alternatively, for small form factor FT sensors 12, the transducer cable 18 may be integral to the FT sensor 12. The transducer cable 18 is a long-life flexible cable specially designed for noise immunity. The transducer cable 18 protects the FT sensor analog output signals from electrical fields and mechanical stress.

The power supply 14 converts 5V power from the DAQ card 16 (that is, from the PC) to clean power used by the FT sensor. The power supply is mounted in a small housing that connects to the transducer cable 18 on one end and to a DAQ cable 20 on the other end. When not mounted in the FT sensor 12, the interface board 22 is mounted in the power supply 14 housing.

The DAQ cable 20 connects the power supply 20 to a DAQ card 16, which is mounted in a PC (not shown) running special software. The DAQ card 16 is preferably commercially available, and may be easily upgraded to conform with whatever expansion bus interface exists on the PC. The DAQ card 16 receives differential DAQ card signals driven by the interface board 22, i.e., the FT sensor analog output signals. The DAQ card 16 converts the analog signals to digital values, calibrates the readings using calibration data read from the interface board 22 (as explained below), and supplies the resulting force/torque readings to special software on the PC for analysis and processing.

The DAQ card 16 typically includes eight differential receivers. As six of the receivers are required to receive the six force and torque readings, two of the receivers may be utilized for other purposes. According to one embodiment of the present invention, the digital calibration data for the FT sensor 12 is transmitted from its storage the interface board 22 on one of the spare analog lines of the DAQ cable 20. In particular, the digital calibration data is transmitted on a spare analog line by "simulating" a digital transmission. That is, to transmit a binary one, the interface board 22 may drive the analog line to a high voltage level, such as 5V, and maintain this output for a predetermined duration. A binary zero may similarly be transmitted by driving a low voltage level, such as 0V, for a predetermined duration. The DAQ card 16 digitizes the respective voltage level of the spare analog line, and provides it to software running on the PC, which interprets the data as a digital 1 or 0 by a simple threshold operation. Note that in any given implementation, a variety of digital encoding schemes may be utilized, such as RTZ, NRZ, or modulation schemes. The SPACE and MARK periods may be predetermined durations, or alternatively may be "clocked" by driving periodically alternating high and low voltages on a second spare analog line. Many variations of implementing the present invention, including conformance with a variety of serial communications protocols, will suggest themselves to one of skill in the art, given this disclosure, and all such variations are included within the scope of the claims.

According to one embodiment of the present invention, a split DAQ cable 24 includes, on the PC end, a DAQ card connector 26 and a serial port connector 28. The DAQ card connector 26 connects six differential analog lines to the DAQ card 16. The serial port connector 28 connects the differential analog signals on which the digital calibration data is transmitted to the receive data and signal ground inputs of a standard computer serial port, such as one that conforms to the EIA RS-232 standard. In this embodiment, the interface board 22 drives the calibration data onto the spare analog line in accordance with the RS-232 standard. The calibration data is then received serially by the computer, such as via a UART (Universal Asynchronous Receiver/Transmitter), and is utilized by software to calibrate the force/torque readings from the DAQ card 16. Alternatively, the interface board 22 may drive two or more spare analog lines with serial digital representations of the calibration data in conformance with a differential transmission standard, such as EIA RS-485. In this case, a RS-485 receiver port on the computer, or an accessory card providing such a port installed therein, would receive the digital calibration data. In alternative embodiments, the interface board 22 may drive digital data on spare analog lines in conformance with any standard serial digital data protocol known in the art, such as for example EIA RS-423, RS-422, or the like.

According to the present invention, any FT sensor 12 is "plug and play" compatible with any standard DAQ card 16, without regards to separately maintaining and associating the calibration data specific to that particular FT sensor 12. Since the calibration data is stored in the FT sensor 12, and is transmitted dynamically to the data analysis computer (through the DAQ card 16 or a serial port), the danger of loading incorrect calibration data for an FT sensor 12 is virtually eliminated. Re-calibration and calibration certification are simplified, as only the FT sensor 12 need be sent in, and upon return, no separate calibration data need be stored or loaded.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A force/torque (FT) sensor, comprising:
   a sensor housing containing at least one transducer operative to convert an applied force or torque to a transducer electrical signal;
   electronics operative to convert said transducer electrical signal to a force/torque signal suitable for reception by a data acquisition system;
   a power supply connected to said sensor housing in power and electrical signal flow relationship, the power supply operative to connect to a data acquisition system via a multi-conductor cable and further operative to transmit said force/torque signal in analog format on the multi-conductor cable;
   memory for storing digital calibration data associated with said sensor.

2. The FT sensor of claim 1 wherein said electronics and said memory reside within said sensor housing.

3. The FT sensor of claim 1 wherein said power supply is operative to transmit said force/torque signal in analog format on one channel of the multi-conductor cable, and to transmit said digital calibration data as a digital bitstream on another channel of the multi-conductor cable.

4. The FT sensor of claim 3 wherein said force/torque signal and said calibration data are transmitted as differential pairs.

5. The FT sensor of claim 1 wherein said electronics and said memory reside within said power supply.

6. The FT sensor of claim 1 further comprising a data acquisition system connected to said power supply via a multi-conductor cable and operative to receive said force/torque signal and said calibration data as analog inputs.

7. The FT sensor of claim 6 wherein said data acquisition system interprets said calibration data as a digital bitstream.

8. The FT sensor of claim 1 further comprising:
a data acquisition system connected to said power supply via a multi-conductor cable to receive said force/torque signal; and
a data communications port also connected to said power supply via a multi-conductor cable to receive said calibration data.

9. The FT sensor of claim 8 wherein said data communications port complies with the EIA RS-232 standard.

10. The FT sensor of claim 9 wherein the two differential lines of said multi-conductor cable carrying said calibration data are connected to the receive data and signal ground connectors of said data communications port.

* * * * *